P. SMITH.
VEHICLE SPRING.
APPLICATION FILED SEPT. 19, 1919.
1,351,306.
Patented Aug. 31, 1920.
2 SHEETS—SHEET 1.
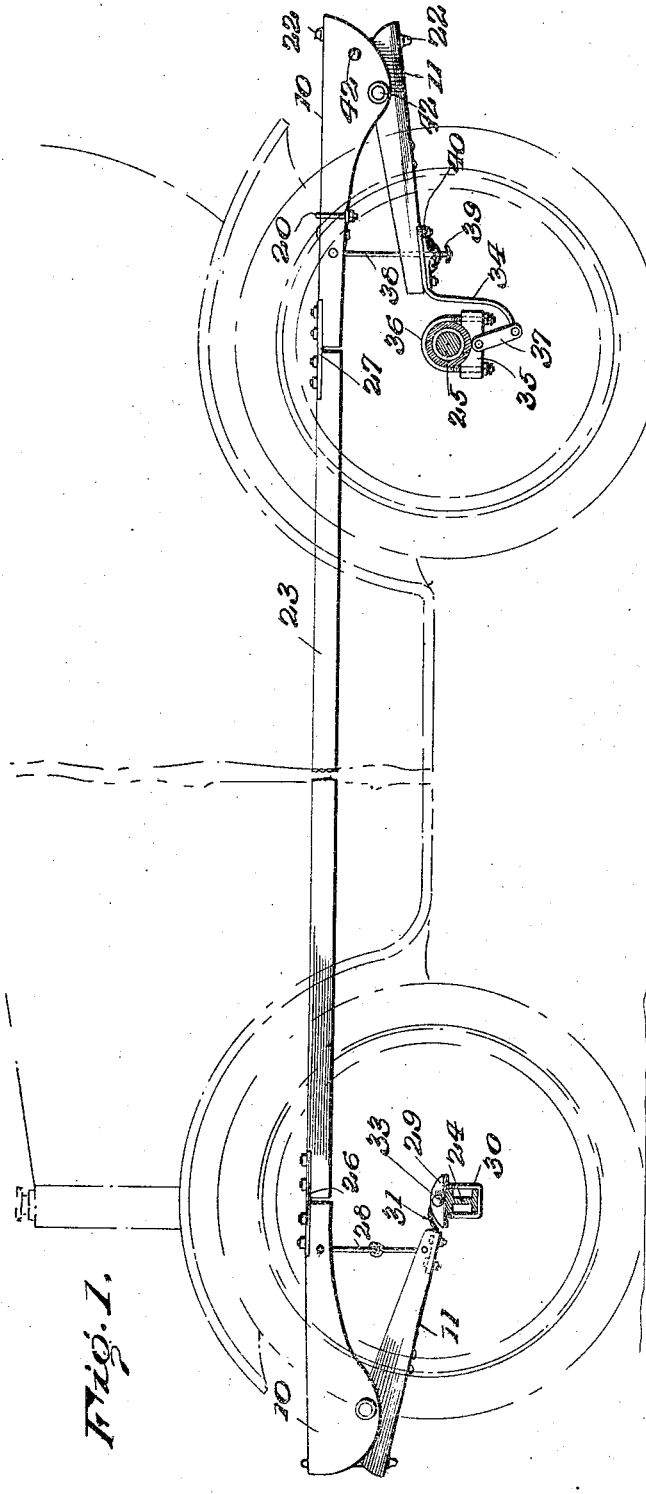
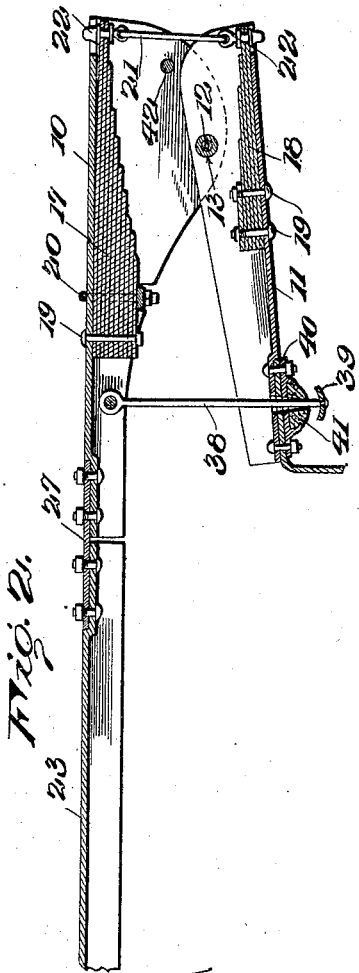
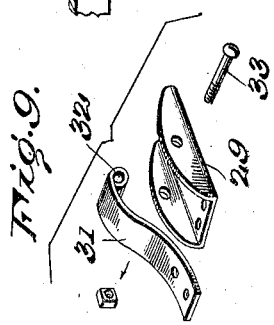
Inventor
P. Smith
by Lacy & Lacy,
his Atty's

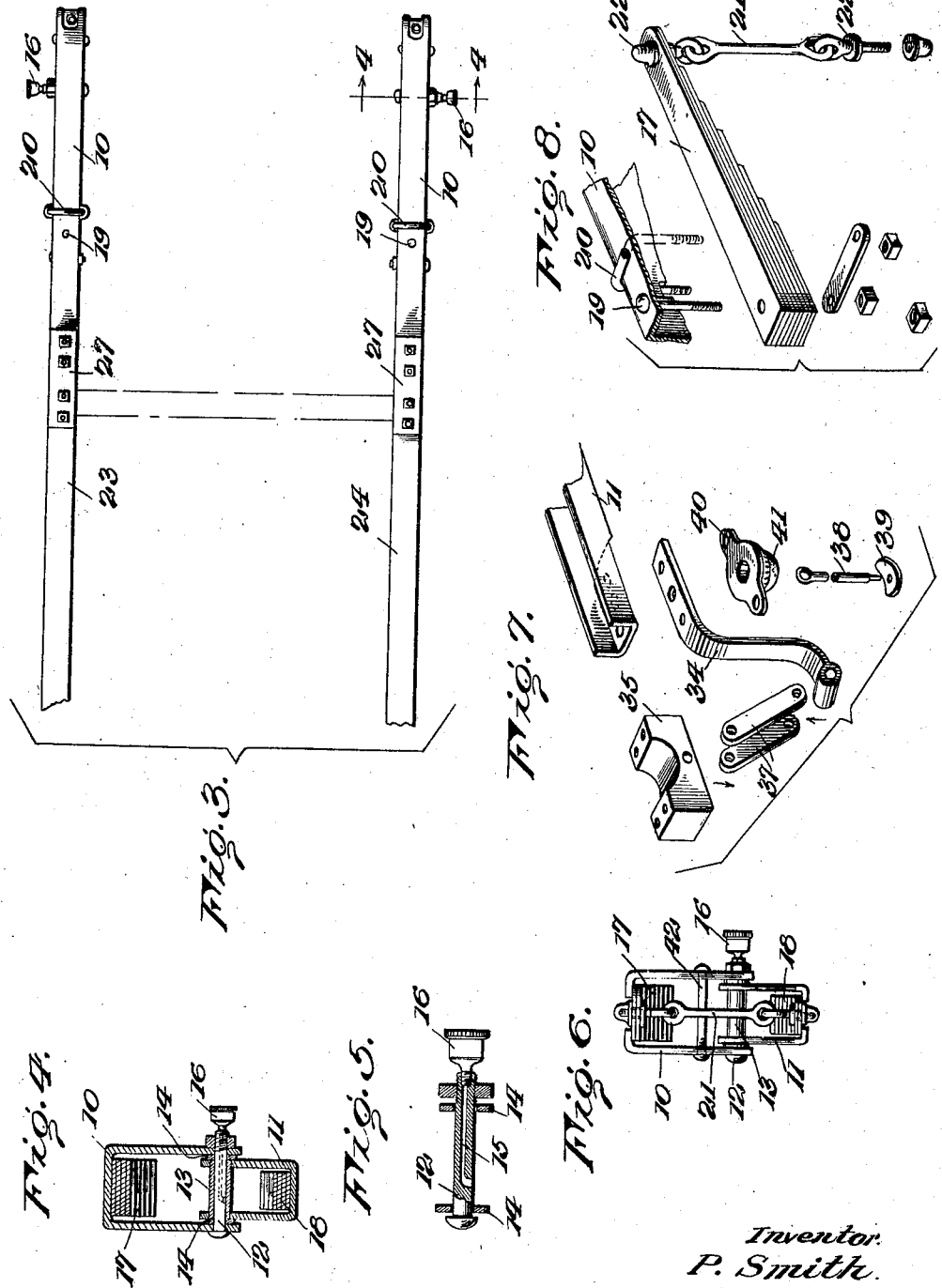
P. SMITH.
VEHICLE SPRING.
APPLICATION FILED SEPT. 19, 1919.
1,351,306.
Patented Aug. 31, 1920.
2 SHEETS—SHEET 2.
Inventor.
P. Smith.
by Lacey & Lacey
his Atty's

UNITED STATES PATENT OFFICE.

PERCY SMITH, OF HIGHLAND PARK, MICHIGAN.

VEHICLE-SPRING.

1,351,306.  Specification of Letters Patent.  Patented Aug. 31, 1920.

Application filed September 19, 1919. Serial No. 324,816.

*To all whom it may concern:*

Be it known that I, PERCY SMITH, citizen of Canada, residing at Highland Park, in the county of Wayne and State of Michigan, have invented certain new and useful Improvements in Vehicle-Springs, of which the following is a specification.

This invention relates to an improved vehicle spring and has as one of its principal objects to provide a spring which will effectually cushion the load carried thereby and will also absorb all ordinary shocks.

The invention has a further object to provide a spring wherein unusual leverage upon the resilient elements of the spring will be had for thus increasing proportionately the easy riding qualities of the spring.

And the invention has as a still further object to provide a spring which may be readily attached to substantially any conventional type of motor vehicle without requiring material structural change therein.

Other and incidental objects will appear hereinafter.

In the drawings:

Figure 1 is a side elevation showing my improved vehicle spring in connection with a conventional type of motor vehicle, Fig. 2 is a longitudinal sectional view taken centrally through one of the rear springs of the vehicle, Fig. 3 is a plan view showing the rear springs of the vehicle, Fig. 4 is a transverse sectional view taken on the line 4—4 of Fig. 3 and looking in the direction of the arrows, Fig. 5 is a detail sectional view of the pivot bolt employed for connecting the fixed and movable arms of the spring, Fig. 6 is a front end elevation of the spring, Fig. 7 is a detail perspective view showing the major parts employed for connecting the rear springs respectively with the rear axle of the vehicle, Fig. 8 is a detail perspective view showing the spring and associated parts carried by the fixed arm of the device, and Fig. 9 is a detail perspective view showing the type of clip employed for connecting the front springs with the front axle of the vehicle.

In carrying the invention into effect, I employ coacting arms 10 and 11 respectively. These arms may be formed of suitable sheet metal and are substantially channel shaped in cross section, the side flanges of the arms being widened toward their outer ends. As will be observed, the side flanges of the arm 11 are freely received between the side flanges of the arm 10 and pivotally connecting the arms adjacent their outer ends is a pivot bolt 12 extending through said flanges. As shown in detail in Fig. 4, a bearing sleeve 13 is fixed between the side flanges of the arm 11 and the pivot bolt extends through this sleeve, washers 14 being interposed between the flanges of the arms upon the bolt. As brought out in detail in Fig. 5, the bolt is provided with a lubricant channel 15 opening within the sleeve 13 and threaded into the outer end of the bolt is an appropriate grease cup 16 communicating with said channel. The bearing between the arms may consequently be effectually lubricated. Mounted within the outer end portion of the arm 10 is a leaf spring 17 having leaves of graduated length and mounted within the outer end portion of the arm 11 is a similar spring 18. These springs seat flat against the transverse walls of the arms and are secured at their inner ends by bolts or other suitable fastening devices 19, clips 20 also being preferably employed upon the arms 10 of the rear springs of the vehicle for securing the leaf springs 17. As best shown in Fig. 3, the clips 20 embrace the arms 10 and the inner end portions of the springs 17 while the cross plates between the shanks of the clips are received in suitable notches in the side flanges of the arms to bear against the springs. At their outer ends the springs 17 and 18 terminate flush with the outer ends of the arms 10 and 11 and extending between the two longest leaves of said springs at their outer ends is a connecting rod 21 secured to said spring leaves by eye bolts or other approved fastening devices 22. As best shown in Figs. 2 and 3, the transverse walls of the arms 10 and 11 are, at their outer ends, provided with notches for freely receiving said bolts.

In order that the mounting and operation of my improved vehicle spring may be accurately understood I have, in the drawings, shown the device in connection with a conventional type of motor vehicle. The longitudinal side bars of the chassis of the vehicle are indicated at 23, the front axle of the vehicle at 24, and the rear axle at 25. As will, of course, be understood, a pair of these springs are employed at the front end of the vehicle and a pair at the rear thereof. The arms 10 of the pair of springs at the front of the vehicle are arranged in alinement with the frame bars 23 of the chassis to project forwardly therefrom and are secured at their inner ends to said bars by plates 26. Similarly, the arms 10 of the pair of springs at the rear of the vehicle are arranged in alinement with the side bars 23 to project rearwardly therefrom and are secured at their inner ends to said side bars by plates 27 corresponding to the plates 26. The arms 10 of the springs will thus be fixed so that, as will be seen, by connecting the inner ends of the arms 11 of the front and rear springs with the front and rear axles respectively, the leaf springs 17 and 18 will be flexed for yieldably sustaining the load. Further, it will be seen that owing to the length of the arms 11, unusual leverage will be had upon the leaf springs for accordingly enhancing the easy riding qualities of the vehicle.

Extending between the inner end portions of the arms 10 and 11 of the front springs of the vehicle are stop rods 28 formed of freely connected sections pivotally engaged at their outer ends with the arms. These rods are thus adapted to limit rebound of the arms 11 of the front springs. Mounted upon the front axle 24 of the vehicle are channel plates 29 each secured to the axle by a pair of U-bolts 30. Secured at corresponding end portions thereof within the arms 11 of the front springs are spring arms 31 extending rearwardly toward the front axle and provided at their rear ends with bearings 32. These bearings fit snugly between the side flanges of the channel plates and receive bolts 33 pivotally connecting the arms 11 of the front springs with the front axle. Secured at corresponding end portions thereto to the rear ends of the arms 11 of the rear springs of the vehicle are spring arms 34 which are bowed beneath the rear axle 25 of the vehicle. Lying beneath this axle are blocks 35 each secured by a pair of U-bolts 36 engaging around the axle and pivotally connecting the free ends of the arms 34 with said blocks are shackles 37. The rear springs are thus operatively connected with the rear axles of the vehicle and in connection with these rear springs I employ stop rods 38 pivotally connected to the arms 10 of said springs and freely received through the arms 11 thereof, being provided at their lower ends with heads 39. Held by the fastening devices securing the spring arms 34 are cups 40 and seated in these cups are resilient cushions 41 which may be formed of rubber. As particularly illustrated in Fig. 2, the rods 38 are received through the cups and through said cushions so that the heads 39 of the rods will coact with the cushions for limiting rebound of the arms 11 of the rear springs. Coöperating with the rods 38 are stop pins 42 extending between the side flanges of the arms 10 of the rear springs for engagement by the outer ends of the arms 11 thereof. Rebound of these arms will thus be effectually limited. As will be seen, the spring arms 31 and 34 will serve to yieldably connect the movable arms of the springs with the front and rear axles of the vehicle.

Having thus described the invention, what is claimed as new is:

1. A device of the character described including pivotally connected arms, springs fixed thereto, and a connection between said springs coupling corresponding end portions of the arms and so arranged that when one of the arms is rocked with respect to the other said springs will be flexed.

2. A device of the character described including pivotally connected arms, springs fixed at corresponding ends thereof to the arms and free at their opposite end portions, and a connection between the free end portions of said springs so arranged that when one of the arms is rocked with respect to the other said springs will be flexed.

3. A device of the character described including pivotally connected arms, springs secured to the arms at points lying at one side of the pivotal center thereof and projecting at the other side of the pivotal center of said arms, and a connection between the springs at the latter side of the pivotal center of the arms so arranged that when one of the arms is rocked with respect to the other said springs will be flexed.

4. A device of the character described including coacting arms mounted to rock one upon the other, springs fixed to the arms, and a connection between said springs located adjacent the outer ends of the arms and so arranged that when the inner end of one arm is moved toward the inner end of the other said springs will be flexed.

5. A device of the character described including coacting arms mounted to rock one upon the other, springs carried by the arms, a connection between said springs located adjacent the outer ends of the arms and so arranged that when the inner end of one arm is moved toward the inner end of the other said springs will be flexed, and means for limiting the inner end of said first mentioned arm in its movement away from the inner end of the other arm.

6. A device of the character described including coacting arms mounted to rock one upon the other, springs carried by the arms, a connection between said springs adjacent the outer ends of the arms, means for connecting one of said arms at its inner end with a vehicle chassis, and means for connecting the other of said arms at its inner end with a vehicle axle.

7. A device of the character described including coacting arms mounted to rock one upon the other, springs carried by said arms and projecting beyond the pivotal center thereof, a connection between the outer end portions of said springs, means for connecting the inner end of one of said arms with a vehicle chassis, a cushioning spring carried by the inner end of the other of said arms, and means for connecting said cushioning spring with a vehicle axle.

8. A device of the character described including substantially channel shaped arms mounted to rock one upon the other, springs lying within the channels of the arms and projecting beyond the pivotal centers thereof, and a connection between the outer end portions of said springs so arranged that when one of the arms is rocked with respect to the other said springs will be flexed.

9. A device of the character described including pivotally connected arms, springs fixed to the arms, and a connection between said springs so arranged that when corresponding end portions of the arms are spread said springs will be flexed toward each other.

10. A device of the character described including coacting arms mounted to rock one upon the other, springs carried by the arms, a connection between said springs so arranged that when the inner end of one arm is moved toward the inner end of the other said springs will be flexed, and a headed stop rod carried by the inner end of one arm and extending through the inner end of the other for limiting the inner end of said first mentioned arm in its movement away from the inner end of the other arm.

In testimony whereof I affix my signature.

PERCY SMITH. [L. s.]